Sept. 14, 1965  J. R. MORGAN  3,206,322
VACUUM DEPOSITION MEANS AND METHODS FOR MANUFACTURE
OF ELECTRONIC COMPONENTS
Filed Oct. 31, 1960  4 Sheets-Sheet 1
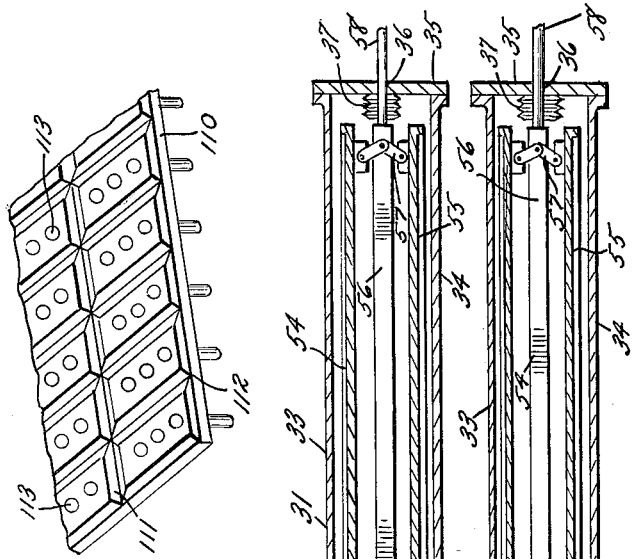

Sept. 14, 1965   J. R. MORGAN   3,206,322
VACUUM DEPOSITION MEANS AND METHODS FOR MANUFACTURE
OF ELECTRONIC COMPONENTS
Filed Oct. 31, 1960   4 Sheets-Sheet 2
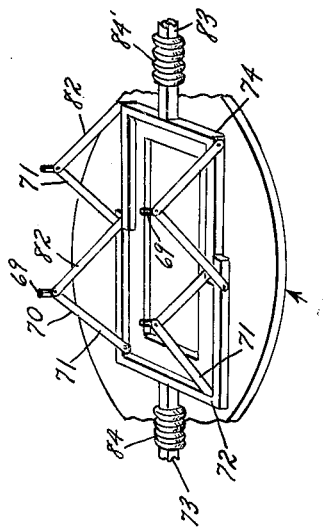
Fig. 3
Fig. 4
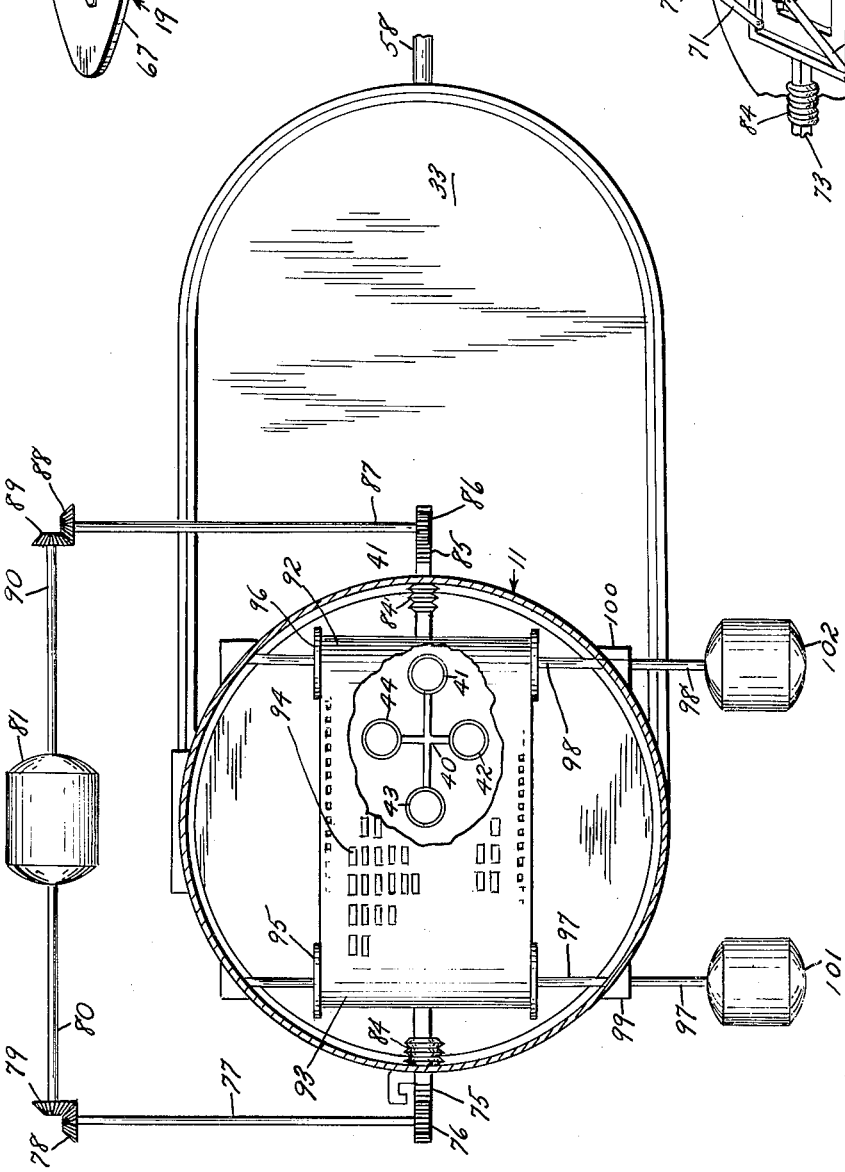
Fig. 2

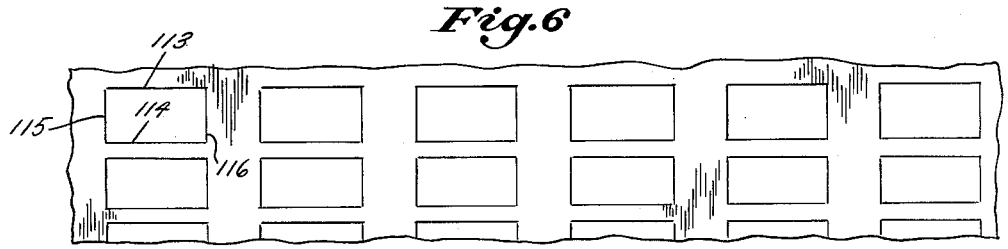
Fig. 6
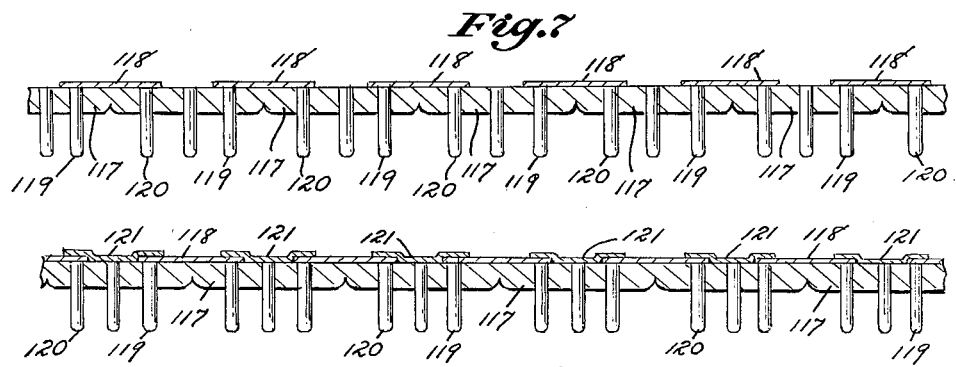
Fig. 7
Fig. 8
Fig. 10    Fig. 9
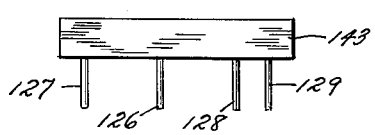
Fig. 11
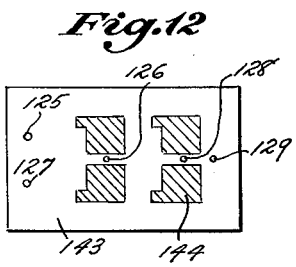
Fig. 12
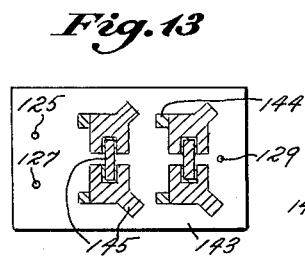
Fig. 13
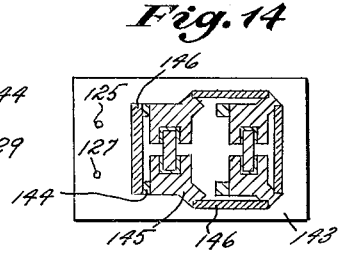
Fig. 14
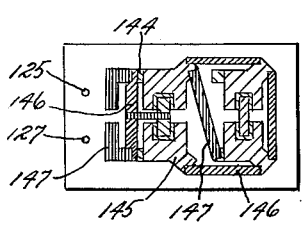
Fig. 15
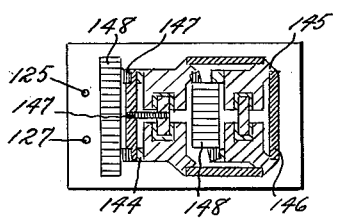
Fig. 16
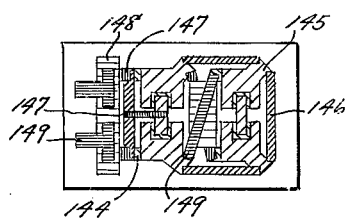
Fig. 17

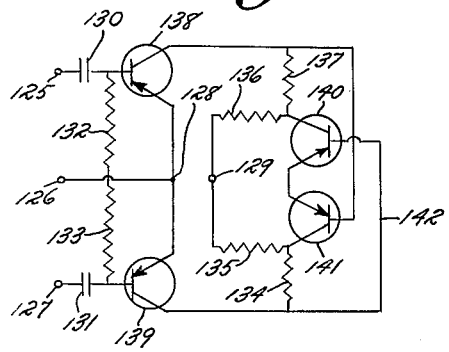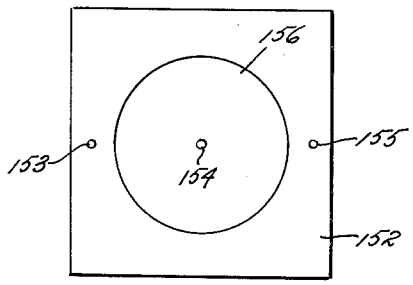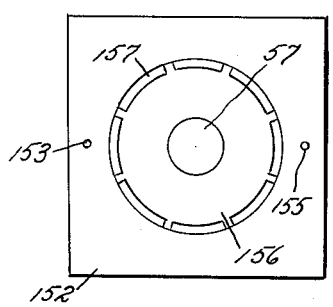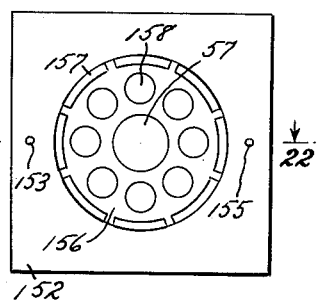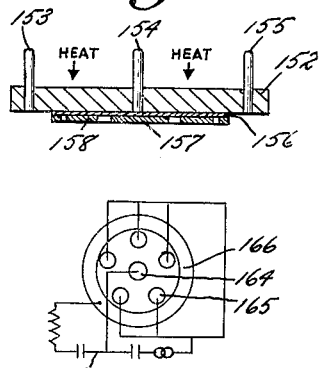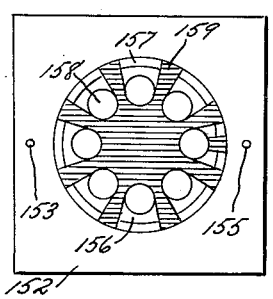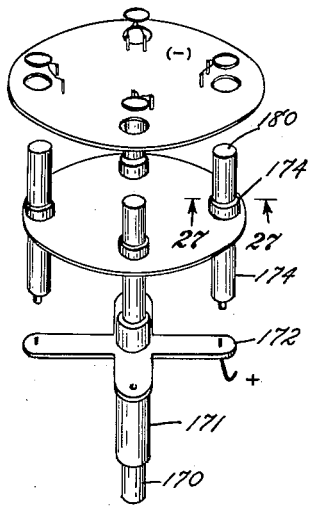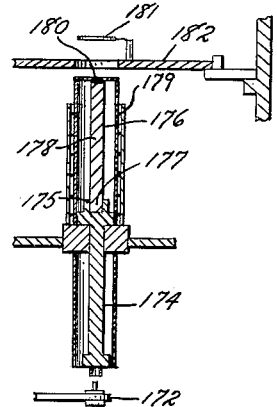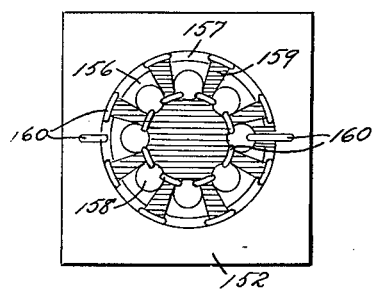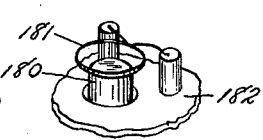

United States Patent Office 3,206,322
Patented Sept. 14, 1965

3,206,322
VACUUM DEPOSITION MEANS AND METHODS FOR MANUFACTURE OF ELECTRONIC COMPONENTS
John Robert Morgan, Palmers Hill Road, Old Greenwich, Conn.
Filed Oct. 31, 1960, Ser. No. 66,284
4 Claims. (Cl. 117—4)

This invention relates generally to the field of the manufacture of electronic components and circuits by the evaporation of materials within a sealed enclosure under high vacuum. The invention has particular application, not only to the manufacture of film transistors, but entire electrical circuits, including such transistors, condensers, connecting conductors, insulators, resistors and the like.

Present methods of transistor manufacture are not well suited to mass production techniques. Regardless of product type, the long chain of procedure involved in metallurgical refinement to produce a complete product is characterized by the demand for extremes in purification, cleanliness and precision during manufacture with a correspondingly disappointing lack of uniformity in the finished product. At the present state of development of the art, transistors, in general, are made along similar lines, the steps in fabrication being classified as follows:

(a) Chemical purification of the semiconductor material.
(b) Zone refining to remove trace impurities.
(c) Doping to produce P or N types of material.
(d) Growing single crystals of doped material.
(e) Slicing and dicing single crystals.
(f) Etching diced pieces to remove non-homogeneous material.
(g) Sandwich formation of material (PNP or NPN).
(h) Attaching conductors to sandwiched parts.
(i) Encapsulating the completed assembly.

The above steps are employed to produce small encapsulated uniform sandwiches of homogeneous doped single crystal semiconducting elements to which conductors are properly attached. It is possible to combine some of these steps, that is to perform them as a single operation, in certain cases, but in the present state of the art, little progress has been made in this direction.

It is among the principal objects of the present invention to provide a process and means for manufacture which substantially omits all of the steps after the first three described above, and, with some modification, all of the steps after the first two described above, as they are presently performed.

Another object of the invention lies in the production of "printed circuit" networks formed in such manner as to include transistor and other components, all of which are made as part of a continuous operation performed under high vacuum.

Still another object of the invention lies in the provision of an improved method for manufacturing electrical components in which the cost of fabrication may be of a very low order, as contrasted with existing techniques known in the art, and with a far greater degree of uniformity obtained in the finished product.

Still another object of the invention lies in the provision of means for manufacturing electronic circuits, in which the manufacturing time and labor required may be reduced to a minimum.

A feature of the invention lies in the fact that the number of circuit components which may be manufactured in a single operation is governed only by the size limitations of the manufacturing apparatus involved, as contrasted with the size of the individual electronic circuit to be manufactured.

These objects and features, as well as other incidental ends and advantages, will more fully appear in the progress of the following disclosure, and be pointed out in the appended claims.

Before entering into a detailed consideration of the disclosed embodiment of the invention, a brief statment of the techniques employed is in order.

Essentially, extremely pure semiconductor material and other material, after careful cleaning by outgassing, bombardment, and other techniques known in the art are evaporated in selected order in a specially constructed apparatus under the influence of a magnetic field or without it, upon a masked substrate which has been previously cleaned by similar methods in a vacuum. Between successive evaporations, the mask and assembled substrate are separated, precisely moved relative to each other, and brought together again. Under conditions of manufacture which may be carefully controlled, a pattern of discrete films is formed, each of which is a sandwich which may or may not be protected by a suitable protective film. The substrate is then removed from the apparatus and separated into individual units as desired. Variations in the selection of semiconductor materials, other materials, in the order of evaporation, mask design and manipulation, construction and material for the substrate will produce a variety of transistors, types of which are now available, and some of which are difficult or impossible to fabricate by present manufacturing methods. By evaporating desired metallic or insulative substances, each in conjunction with a pre-aligned mask, not only transistors or components thereof, but entire circuits may be formed within a vacuum enclosure.

The vacuum evaporation of semiconducting materials is not new. Attempts to form thin films of single crystal material by epitaxial growth on single crystal substrates have also been reported in the literature [see B. Elschner and D. Unangst, 11a. Z. Naturforsch, 98 (1956); L. E. Collins and O. S. Heavens, B65 Proc. Phys. Soc. (London) 825 (1952); and L. E. Collins and O. S. Heavens, B70 Proc. Phys. Soc. (London), 265 (1957)]. A patent (F. Lichtgarn, U.S. Patent No. 2,804,581, August 27, 1957) describes head portions of emitter and collector pin electrodes and other parts coated with semiconducting films by conventional thermal evaporation techniques. The major difficulties in these and other experiments have been summarized to be, among other things, the lack of equilibrium conditions at the substrate [see R. P. Ruth, J. C. Marinace and W. C. Dunlap, Jr., 31 J. Appl. Phys., 995 (1960)]. Three contributory factors to the lack of equilibrium conditions at the substrate surface during evaporation should be considered here: the effect of gas molecules striking the surface, diffusion from the substrate bulk into the surface, and those molecules strongly adsorbed on the surface. Holland [see L. Holland, "Vacuum Deposition of Thin Films" (J. Wiley & Sons, Inc., New York) (1956), p. 6], in discussing the first factor, shows that where a 500 A. thick film of aluminum is evaporated in one minute at a pressure of $10^{-4}$ mm. Hg, $4 \times 10^{16}$ gas molecules/cm.$^2$/sec. impinge on the surface compared to $5 \times 10^{13}$ aluminum atoms/cm.$^2$/sec., or that 1000 gas molecules strike the surface for every aluminum atom. Dependent upon temperature and diffusivity, additional gas molecules arrive at surface from inside the substrate. Finally, neglecting chemical reaction between the aluminum and gas atoms, there is usually more than one gas present at $10^{-4}$ mm. Hg, and consequently an undetermined number of aluminum atoms never reach the actual substrate surface because they strike adsorbed gas molecules.

The vacuum evaporating apparatus described here to prepare film-deposited transistor components, or circuits containing them, minimizes to a practical degree the above described problems. It differs from the usual equipment in several essential ways that will be explained. First it must be capable of producing and sustaining pressures below $10^{-9}$ mm. Hg, since all evaporations are made below this pressure. Only below this pressure have gas impurities in the vacuum system been removed to a sufficient degree that the residual gas molecules do not seriously contaminate the deposited films. In the above example of Holland, increasing the evaporation rate by a factor of ten and reducing the pressure to $10^{-9}$ mm. Hg and neglecting for the moment diffusion and adsorption effects, would produce a film of aluminum with a gas impurity of only 1%. As successive evaporations are made, further reductions in pressure and impurity concentration are realized, since the evaporants act as "getters," a technique in vacuum evaporation well known. Secondly, before any evaporations are made, the entire apparatus with all the necessary parts, as substrates, evaporants, masks and the mechanisms to manipulate them sealed inside, is baked until everything inside is completely outgassed. If this step is omitted or neglected it is impossible to obtain the low pressures needed. At the same time, however, the problem of gas diffusing onto the substrate surface is disposed of. Again before proceeding with the evaporations, the substrate surface and the evaporant surfaces are subjected to alternate bombardment and heat to remove the adsorbed gas molecules. It has been shown [see H. E. Farnsworth, R. E. Schlier, T. H. George and R. M. Burger, 29 J. Appl. Phys., 1150 (1958)] that atomically clean surfaces may be obtained in this manner, substantiating the soundness of this last procedure.

The above described changes in ordinary vacuum evaporation provide that the deposited films will be free of unwanted impurities but do not insure single crystal structure for each discrete film. Few, if any, will be perfectly ordered merely as a consequence of having been evaporated in a vacuum. Means, as epitaxial growth from single crystal substrates must be provided. Alternatively, zone leveling may be used inside the vacuum chamber. After an evaporation is completed and the assembled substrate holder separated from the mask, a hot thin tungsten wire is slowly passed across the assembled substrate surface close enough to cause a thin melted zone in the deposited film but with insufficient energy transfer to cause evaporation. Heating may be by thermal conduction or electron bombardment. A radiant shield around the wire also serves as a focusing electrode. Positive bias on the films is provided by a metal plate resting on the conductors fixed to the substrate. After several passes the film structure will be single crystal [see A. Calverly, M. Davis and R. F. Lever, 34 J. Sci. Instr., 142 (1957)]. Small mass and size of each discrete film reduce opportunities for crystal dislocations.

Water vapor, oxygen, carbon dioxide and other molecules normally present in air are unavoidably adsorbed on all surfaces in contact with air, including etched, polished, lapped and otherwise treated surfaces of semiconducting or other elements which become parts of the sandwich of a transistor component. These molecules become randomly trapped and diffused on or near the pn junction, introducing another element of irregularity, avoided under the conditions now explained. Sandwich formation takes place under conditions of ultra high vacuum. It is accomplished with a mask which may be moved with respect to the substrate between successive evaporations. A simple movable mask may be a rigid or rigidly held properly perforated sheet of metal, for example tantalum or molybdenum, in close proximity to the substrate. After initial evaporation the substrate is raised and the mask linearly displaced to its position for the next evaporation which proceeds after the substrate is lowered again. If it is assumed that the length of each constant width substrate element is $A$, the length of each mask opening would be $2A/3$, distance between openings $A/3$, linear displacement $A/2$. If the size of each substrate element was $0.100''$ wide $\times$ $0.250''$ long $(=A)$, there would be 1440 units in a substrate area $6'' \times 6''$. A $10'' \times 10''$ substrate would be equivalent to 4000 units. Using this mask, only two evaporations are needed to produce 16000 NPN or PNP transistors on four $10'' \times 10''$ substrates in a $36''$ diameter vacuum chamber. Additionally, a succession of different masks, one for each evaporation, in the form of a long ductile metal sheet, each end of which is attached to and wound around a spool, provides means to change the design of the deposited films during each evaporation. The designs produced by photo etching or other known methods are changed by rotating the spools. Using this variation entire circuits may be produced. Temperature gradient zone melting is an additional variation, as will be explained.

The apparatus for accomplishing the above ends may consist of two complete sets of equipment for vacuum evaporation with a common evaporating chamber divided into an upper and a lower section by a sliding vacuum valve. Since each section can be evacuated alternately or successively, it is not imperative to have two complete sets of pumps. Preferably the lower section contains the semiconductor and other material to be evaporated, while the upper section holds the mask and assembled substrate. In operation, each is outgassed, bombarded and otherwise cleaned. When proper conditions, such as pressure, temperature, etc., have been attained, the sliding vacuum valves are opened, and without introducing any foreign substance which might interfere with evaporation which then proceeds as desired. The valves are closed upon completion of a series of evaporations, and the contents of the lower section may then be kept in a standby condition without contamination, while further substrate processing continues in the upper section. Thus, the completed substrate may be removed from the upper section without disturbing the lower section, and a new assembled substrate placed into the upper section which is then sealed to begin a subsequent cycle.

The design of the substrate may be varied according to individual requirements. For example, the entire substrate may be cast or molded as one piece containing the formed individual circuit elements, and including holes for the insertion of conductors. It might also be made in the form of strips, which, after conductors are attached, are placed side by side to make up an assembled substrate. Separately attached conductors may be press-fitted into openings, or riveted, as is well known in the art.

In the drawings, to which reference will be made in the specification, similar reference characters have been employed to designate corresponding parts throughout the several views.

FIGURE 1 is a schematic vertical longitudinal sectional view of an embodiment of the invention.

FIGURE 2 is a plan view thereof with the upper wall of the tank element removed for purposes of disclosure.

FIGURE 3 is a view in perspective showing the substrate holder.

FIGURE 4 is a fragmentary view in perspective showing means for supporting the substrate holder upon a part of a screening element.

FIGURE 5 is a fragmentary view in perspective showing one form of substrate element.

FIGURE 6 is a fragmentary plan view of a mask used in connection with the deposition of material upon a substrate element.

FIGURE 7 is a fragmentary sectional view showing a first deposition of material upon an assembled substrate element.

FIGURE 8 is a similar fragmentary sectional view showing a second deposition of material overlapping the first deposition shown in FIGURE 7.

FIGURE 9 is a sectional view showing a completed transistor unit severed from the substrate element shown in FIGURE 8.

FIGURE 10 is a similar sectional view showing an alternate form of deposition.

FIGURE 11 is a side elevational view of a complete electronic circuit formed in accordance with the present invention.

FIGURE 12 is a plan view of a substrate element at the completion of a first deposition of material.

FIGURE 13 is a similar plan view at the completion of a second deposition.

FIGURE 14 is a similar plan view after the completion of a third deposition.

FIGURE 15 is a similar plan view showing the substrate element after a fourth deposition.

FIGURE 16 is a similar plan view of the substrate element after a fifth deposition.

FIGURE 17 is a similar plan view of the substrate element after a sixth deposition.

FIGURE 18 is a schematic diagram of the completed circuit as a component made in accordance with the steps shown in FIGURES 12 to 17, inclusive.

FIGURE 19 is a plan view of a substrate element having a first deposition thereon, forming a part of a relatively complicated form of transistor.

FIGURE 20 is a similar plan view showing a second deposition.

FIGURE 21 is a similar plan view showing a third deposition.

FIGURE 22 is a transverse sectional view as seen from the plane 22—22 in FIGURE 21.

FIGURE 23 is a plan view of the substrate element shown in FIGURE 20 at the completion of a fourth deposition of material.

FIGURE 24 is a plan view of the substrate element shown in FIGURE 19 after a fifth and final deposition of material.

FIGURE 25 is a schematic wiring diagram of the transistor shown in FIGURE 24.

FIGURE 26 is a fragmentary view in perspective showing an alternate form of evaporating means which may be substituted in the structure shown in FIGURE 1.

FIGURE 27 is a fragmentary sectional view as seen from the plane 27—27 in FIGURE 26.

FIGURE 28 is a fragmentary enlarged view in perspective corresponding to the upper left hand portion of FIGURE 26.

In accordance with the invention, the device, generally indicated by reference character 10, comprises broadly: a tank element 11, an evaporating element 12, vacuum producing means 13, movable vacuum-retaining valve elements 14 and 15, a substrate supporting element 19 and a screening element 21.

The tank element 11 may be of any suitable construction capable of retaining an extremely high vacuum. In the construction indicated in FIGURE 1, the element 11 includes a base wall 24, a lower side wall 25 defining a lower chamber 26, and an intermediate side wall 27 cooperating with an upper side wall 28 to form an upper chamber 29. A top wall 30 may be of dome-shaped configuration. Extending laterally from the principal axis of the tank element are a pair of valve housings 31 and 32, each including an upper wall 33, a lower wall 34 and an end wall 35 having an opening 36 therein provided with a suitable vacuum seal 37.

The evaporating element 12 may be of any suitable design, as for example that illustrated in FIGURES 1 and 2 which includes a rotatably mounted plate member 40 supporting a plurality of evaporation crucibles 41, 42, 43 and 44. The plate 40 is supported upon a centrally located vertically mounted shaft 45 having means (not shown) extending outwardly of the tank element to provide for selective indexed rotation to position a single crucible 41–44 approximately centrally within the tank element for evaporation of an evaporant disposed therein. The evaporants (not shown) may include a wide variety of material, such as aluminum for conductors, silicates or ceramic-type materials for insulation, doped germanium materials for the formation of transistors, materials having high electrical resistance such as Nichrome and the like for the formation of resistors, etc. The number of evaporant crucibles 41–44 is limited only by the design of the physical structure involved, and, where desired, more than the four crucibles illustrated may be employed. The indexing means (not shown) which controls the shaft 45 may be of any suitable well known design. Heating elements 46 and 47 are suitably positioned as indicated to provide necessary evaporating temperatures, and are controlled with regard to power consumption by external means (not shown).

The vacuum producing means 13 preferably includes an oil or ion diffusion pump (not shown) and may be operated in conjunction with a liquid nitrogen or other trap well known in the art. As best seen in FIGURE 1, it includes an upper outlet 49 servicing the upper chamber 29, a lower outlet 50 servicing the lower chamber 26, and an intermediate outlet 51 in the vicinity of one of the valve elements 14. The vacuum producing means 13 should be capable of creating an inner atmospheric pressure of at least $10^{-9}$ mm. of mercury in order that the proportion of gas molecules striking the substrate-supporting element 19 in relation to the number of evaporant molecules is negligible.

The vacuum retaining valves 14 and 15 may be of any well known sliding type, each including an upper septum 54, a lower septum 55 and a control member 56 expanding corresponding toggle members 57 upon impetus of a motion input shaft 58. In engaged condition, the valves seat within corresponding seal portions 59 in the tank element 11, and are preferably provided with sealing gaskets 60.

The substrate-supporting element 19 serves to maintain the substrate element 68 in a generally horizontally disposed position above the evaporating element 12. It includes a mounting plate 66 movably supported by the screening element 21, having means on the lower surface 67 in the form of clamps (not shown) for supporting the substrate element 68. Notch-bearing members 69 engage a lazy tong mechanism 70, in which a portion of the links 71 are secured to a first planar member 72. The planar member 72 is connected through a rod 73 to a rack 75 driven by a pinion 76. The pinion 76 is mounted on a shaft 77 driven through gears 78 and 79 from an output shaft 80 on a small geared motor 81. The remaining links 82 of the lazy tong mechanism 70 are connected to a corresponding plate 74, in turn moved by a rod 83, rack 85, pinion 86, shaft 87, gears 88 and 89, and shaft 90. The rods 73 and 83 pass through vacuum seals 84 and 84' which maintain the atmospheric pressure within the tank element 11. As will be apparent from a consideration of FIGURE 4, operation of the motor will result in the raising or lowering of the substrate supporting element 19, to provide adequate clearance with the screening element 21 during movement of the screening element with respect to the substrate.

The screening element 21 is preferably formed from thin metallic planar material, preferably tantalum or molybdenum. The screen, generally indicated by reference character 92 is of generally elongated configuration, including a plurality of segments 93, each having predetermined openings 94. The screen 92 is mounted upon first and second spools 95 and 96 arranged for rotation about parallel axes upon shafts 97 and 98 which extend through rotary vacuum seals 99 and 100 to be selectively driven by geared motors 101 and 102, under the control of indexing means 103 of well known type.

Referring to FIGURE 5, the substrate element 110 may be formed of any suitable material, and may be made frangible by lined indentations 111, 112, arranged at mutual right angles. Openings 113 may be provided for the attachment of conductors or leads 113′ as is well known in the art. Where relatively complicated circuits are formed, the size of the individual circuits is necessarily increased, and the number of circuits which may be formed simultaneously is correspondingly reduced.

Operation of the device is substantially as outlined hereinabove, the very pure materials being placed within the evaporating element 12 prior to sealing of the lower chamber 26. Upon the creation of sufficient vacuum, the materials may be further refined within the sealed lower chamber prior to evaporation. Upon the positioning of the substrate element within the upper chamber 29, and the formation of a vacuum therein, the valve element 14 is then opened for outgassing, following which the valve 15 is opened, and the evaporants successively evaporated so that vapor may pass through the screening element 21 to become deposited upon the lower surface of the substrate element. Upon the completion of each evaporating operation, the plate member 40 is rotated to a new position, and the screening element 21 advanced to a new corresponding position, following which the evaporation of the subsequent crucibles 41–44 is performed. With the completion of the final evaporation, the valves 14 and 15 are slid to closed position, and the upper chamber 29 opened to permit removal of the substrate element with its deposited films. The completed substrate element may then be severed into individual circuits including formed components such as transistors, etc., and a second substrate element inserted into the upper chamber 29 so that the process may be repeated.

It is to be emphasized that the entire process takes place in a very high vacuum, wherein doped materials are able to maintain a high degree of purity both prior to deposition and thereafter. Where the final evaporant is an insulating sealing medium, the completed circuit may be completely encapsulated before air is permitted to flow into the upper chamber, thus permanently sealing out all impurities which might otherwise attach themselves to the deposited materials.

Turning now to FIGURE 6, there is shown a fragmentary view of the mask openings 94, in a typical application being of generally rectangular configuration. Each opening 94 is bounded by longer edges 113 and 114, as well as shorter edges 115 and 116. In use, the mask openings 94 are positioned above individual substrate members 117 (see FIGURE 7). Where the openings 94 are offset with respect to the members 117, a first deposition of material, generally indicated by reference character 118, will overlie a first terminal 119 of one substrate member 117 and a second terminal 120 of an adjoining substrate member 117. The openings 94 may then be shifted a short distance, to permit a second deposition 121 to overlie the terminals 119 and 120 of a single member 117 as indicated in FIGURE 8. When the members 117 are separated from each other, the result will be a plurality of individual transistors, one of which is indicated by reference character 122 in FIGURE 9. If the order of evaporation is reversed, a variation shown by reference character 123 in FIGURE 10 is obtained, the particular technique employed depending upon the materials being used and the type of transistor desired.

In FIGURES 11 to 18, there is shown a method of producing a relatively complex circuit which may be formed as a plug-in component of a larger circuit, the entire circuit being formed using the techniques above described. Aside from the economies of manufacture, the fabrication of an entire circuit in this manner permits the entire circuit to be replaced should defects or breakdown occur in any part of the individual component. As the cost of manufacture is relatively small as contrasted with formation of the circuit in a conventional manner, the amelioration of servicing problems will be readily appreciated.

Referring to FIGURE 18, there is illustrated a typical base-gated direct-coupled flip-flop electronic circuit including first, second, third, fourth and fifth terminals; 125, 126, 127, 128 and 129, respectively. These are formed in the substrate in any well known maner, as for example that shown by Lichtgarn in U.S. Patent No. 2,804,581. To these terminals are interconnected condensers 130 and 131, as well as resistors 132, 133, 134, 135, 136 and 137. This circuit includes four transistors 138, 139, 140 and 141, the above described subcomponents being interconnected by conductors generally indicated by reference character 142.

Referring to FIGURE 12, the crystalline substrate 14 is provided in the manner above described, although of generally larger dimensions than is the case where only individual transistors are being formed. The first deposition 144 simultaneously forms by evaporation of doped germanium, the basis of each of the four transistors 138–141, inclusive. The second evaporation, generally indicated by reference character 145, consists of an evaporation of oppositely doped germanium, and simultaneously forms the collectors and emitters of each of the four transistors.

The transistors formed, reference is made to FIGURE 14, where all of the resistors 132–137, inclusive, are simultaneously formed by a third deposition 146 of Nichrome alloy material.

In the fourth evaporation, illustrated in FIGURE 15 in the drawing, an evaporation of aluminum 147 partially forms the connections between the already formed subcomponents, and half of the condensers 130 and 131.

Referring to FIGURE 16, the fifth evaporation forms the remaining parts of the condensers 130 and 131, as well as the necessary insulation between the components, the substance evaporated being silicon monoxide or magnesium fluoride.

Referring to FIGURE 17, the sixth evaporation is again of aluminum, with the completion of the remaining conductors 142, the sixth evaporation being indicated by reference character 149.

Prior to removal of the substrate 143, the now completed circuit is preferably completely covered by an evaporation of the entire surface with a low melting point glass, to avoid contamination of the same when the substrate 143 is subsequently exposed to the atmosphere.

Referring to FIGURES 19 to 25, inclusive, there is shown schematically an analog transistor having operational characteristics approximating that of a vacuum tube. This transistor was one of a number described by Shockley (Unipolar and Analog Transistors, 40 Proc. I.R.E. 40, No. 11, pp. 1289–1313, November 1952). Due to manufacturing difficulties, this transistor has not been made in the prior art.

Referring to FIGURE 19, a crystallized substrate 152 is provided, the same being equipped with three terminals 153, 154 and 155 of the type above described. The first evaporation 156 is of undoped pure germanium. The second evaporation 157, shown in FIGURE 20, is of donor doped germanium, and, as may be observed, is segmentized owing to the necessity of providing means for supporting the central portion of the mask (not shown). The third evaporation 158 is of acceptor doped germanium. Upon the completion of the third deposition 158, heat is applied from above to cause formation of the N and P zones. This is preferably accomplished by temperature gradient zone melting as described by Pfann in U.S. Patent No. 2,770,761.

The fourth evaporation 159, illustrated in FIGURE 23, deposits an insulating layer using either of the insulating materials mentioned hereinabove, while the fifth evaporation 160, shown in FIGURE 24, deposits the conductors of aluminum or silver. At the completion of the fifth evaporation, an insulating layer of low-melting point glass (not shown) may also be made.

The resulting transistor, as seen in FIGURE 25, includes an N-type cathode 164, P-type grids 165 and an N-type plate 166. If desired, the external circuitry 167 may be formed by separate evaporation steps (not shown), some of which may be combined with the steps illustrated.

Referring to FIGURES 26 to 28, inclusive, there is shown an alternate form of evaporating means which is superior to that illustrated in FIGURE 1. The rotational shaft 170 is slidably disposed within a sleeve 171, a raising element 172 having a positive electrical potential impressed thereupon. The individual evaporant holders 174 are provided with socket means 175 (see FIGURE 27), while the evaporants 176 are preferably in the form of thin cylinders which have been previously zone-leveled. The evaporants are supported in vertical orientation, the lower ends 177 being inserted within the socket means 175, while the main body portion 178 thereof is surrounded by a heater element 179 which maintains the stick during evaporation at close to evaporation temperature. The upper end 180 of the stick is positioned within a loop 181 of heated tungsten wire supported upon a negatively charged plate 182 having openings 183 through which the evaporants project. The upper ends of the stick are heated to volatilization point by electron bombardment, the wire 181 forming the cathode emitter. In the illustration in FIGURE 26, all of the stick evaporants are of the same material, and by the dispersed arrangement of the evaporants, a uniform cloud of molecules is obtained with a substantially total elimination of beaming which might provide uneven deposition of the evaporant upon the substrate element. Other sets of evaporants may be disposed between the four evaporant sticks shown, for serial evaporation as described above.

It may thus be seen that I have invented novel and highly useful improvements in means and methods for manufacturing electrical and electronic components, in which by means of an enclosure in which an ultra high vacuum may be created, the enclosure having movable masking means operated in selective advancement with the evaporation of a series of evaporants, individual components, entire circuits including transistors, and other electrical components may be formed by mass production, in which the operational characteristics of each of the components so formed will be substantially identical. The invention contemplates the use of substrates which have been formed as single crystalline structures so that the deposition of material upon the substrates will also be in the form of a single crystal. It is possible not only to form the components, but to completely protect them prior to exposure to the outside atmosphere, thereby assuring a minimum of contamination to the exposed surfaces of the components during use or subsequent handling.

I wish it to be understood that I do not consider the invention limited to the precise details of structure shown and set forth in this specification, for obvious modifications will occur to those skilled in the art to which the invention relates.

I claim:

1. In a method of simultaneously forming a plurality of similar electronic components by successive vacuum evaporation of materials upon a substrate, the steps of:
   (a) providing a sealed enclosure;
   (b) providing a plurality of evaporants within said enclosure for serial evaporation;
   (c) providing a planar frangible relatively rigid substrate having an exposed planar area greater than that of a completed component, and supporting the same in fixed relation within said enclosure;
   (d) providing a flexible planar masking element, having a plurality of major areas thereon, each major area corresponding to the area of said substrate and having therein a plurality of substantially similar masking openings extending over individual portions of said major areas, said portions corresponding to the areas of individual components;
   (e) supporting said flexible planar masking element within said enclosure for movement relative to said substrate in a plane parallel to the plane of said substrate between successive evaporations, between said plurality of evaporants and said substrate;
   (f) depositing a first of said plurality of evaporants through the openings of one of said major areas;
   (g) moving said masking element to position a second major area of said masking element between said evaporants and said substrate to place the openings therein in predetermined relation relative to the areas of deposit of said first evaporant;
   (h) depositing a second evaporant through the masking openings of said second major area of said masking element; and
   (i) subdividing said substrate to form a plurality of individual electronic components.

2. In a method of simultaneously forming a plurality of similar electronic components by successive vacuum evaporation of materials upon a substrate, the steps of:
   (a) providing a sealed enclosure;
   (b) providing a plurality of evaporants within said enclosure for serial evaporation;
   (c) providing a planar frangible relatively rigid substrate having an exposed planar area greater than that of a completed component, and supporting the same in fixed relation within said enclosure;
   (d) providing a flexible planar masking element, having a plurality of major areas thereon, each major area corresponding to the area of said substrate and having therein a plurality of substantially similar masking openings extending over individual portions of said major areas, said portions corresponding to the areas of individual components;
   (e) supporting said flexible planar masking element within said enclosure for movement relative to said substrate in a plane parallel to the plane of said substrate between successive evaporations, between said plurality of evaporants and said substrate;
   (f) depositing a first of said plurality of evaporants through the openings of one of said major areas;
   (g) moving said masking element to position successive major areas of said masking elements between said evaporants and said substrate to position the openings therein in predetermined position relative to the areas of previous deposit of evaporant, and depositing a subsequent evaporant upon said substrate between each of said movements; and
   (h) subdividing said substrate to form individual electronic components.

3. In a device for simultaneously manufacturing a plurality of electronic components by serial deposition of evaporants: a sealed enclosure, a plurality of evaporants disposed within said sealed enclosure, means for selectively evaporating any of said evaporants from a predetermined position within said enclosure, a planar frangible substrate supported in fixed position within said enclosure, a planar masking element having a plurality of major areas, each of said major areas including a plurality of similar masking openings extending therethrough, indexing means for selectively positioning each of said major areas of said masking element opposite said fixed substrate, and means for moving said masking element in a direction substantially perpendicular to the plane thereof for selectively abutting successive major areas thereof in contact with said fixed substrate.

4. In a device for simultaneously manufacturing a plurality of electronic components by serial deposition of evaporants: a sealed enclosure, a plurality of evaporants disposed within said sealed enclosure, means for selectively evaporating any of said evaporants from a predetermined position within said enclosure, a planar frangible substrate supported in fixed position within said enclosure, a planar masking element having a plurality of major areas, each of said major areas including a plurality of similar masking openings extending therethrough, indexing means for selectively positioning each of said major areas of said masking element opposite said fixed substrate, and means for moving said masking element in a direction substantially perpendicular to the plane thereof for selectively abutting successive major areas thereof in contact with said fixed substrate; and vacuum-retaining valve means selectively disposed within said enclosure between said masking element and said plurality of evaporants.

References Cited by the Examiner

UNITED STATES PATENTS

| | | | |
|---|---|---|---|
| 2,153,363 | 4/39 | Bruche | 117—71 |
| 2,849,583 | 8/58 | Pritikin | 117—201 |
| 2,898,241 | 8/59 | Charlton et al. | 117—107.1 XR |
| 2,948,261 | 8/60 | McGraw | 117—212 XR |
| 2,969,296 | 1/61 | Walsh | 117—200 |
| 2,986,717 | 5/61 | Misserocchi | 117—212 XR |
| 3,023,727 | 3/62 | Theodoseau et al. | 118—49 XR |

FOREIGN PATENTS

| | | |
|---|---|---|
| 801,030 | 9/58 | Great Britain. |
| 307,775 | 8/55 | Switzerland. |

RICHARD D. NEVIUS, *Primary Examiner.*